(12) United States Patent
Kobres

(10) Patent No.: US 8,360,310 B2
(45) Date of Patent: Jan. 29, 2013

(54) METHODS AND APPARATUS FOR USER INTERFACE MANAGEMENT IN POINT OF SALE APPLICATIONS

(75) Inventor: Erick Christian Kobres, Lawrenceville, GA (US)

(73) Assignee: NCR Corporation, Duluth, GA (US)

( * ) Notice: Subject to any disclaimer, the term of this patent is extended or adjusted under 35 U.S.C. 154(b) by 1071 days.

(21) Appl. No.: 12/342,606

(22) Filed: Dec. 23, 2008

(65) Prior Publication Data

US 2010/0162144 A1 Jun. 24, 2010

(51) Int. Cl.
*G07D 11/00* (2006.01)
(52) U.S. Cl. ........................................ 235/379; 235/380
(58) Field of Classification Search .................. 235/379, 235/380
See application file for complete search history.

(56) References Cited

U.S. PATENT DOCUMENTS 5,371,348 A * 12/1994 Kumar et al. ............. 235/472.02
5,386,106 A * 1/1995 Kumar ............................ 235/380

\* cited by examiner

*Primary Examiner* — Daniel Hess
(74) *Attorney, Agent, or Firm* — Peter H. Priest; Kevin P. Belote

(57) ABSTRACT

Systems and techniques for managing implementation of user interfaces and related elements of a point of sale application. A stencil is created to define aspects of a user interface to be used with on or more point of sale applications. A user interface defined by the stencil is integrated with a point of sale application model, with integration including establishing bindings between elements defined by the stencil and corresponding elements of the application and importing appropriate specific elements defined by the model to more generalized elements defined by the stencil. An integrated point of sale configuration is loaded to one or more point of sale stations for use in point of sale operations.

17 Claims, 8 Drawing Sheets

METHODS AND APPARATUS FOR USER INTERFACE MANAGEMENT IN POINT OF SALE APPLICATIONS

FIELD OF THE INVENTION

The present invention relates generally to improvements to point of sale operations. More particularly, the invention relates to improved systems and techniques for changeable user interfaces for point of sale applications, based on the current needs of the application and the current configuration of the point of sale station.

BACKGROUND OF THE INVENTION

Typical modern point of sale stations present an interface to the user that is adapted to the specific environment in which the point of sale station is being used. A restaurant application may present a menu to a user, whether an employee or a self service customer, that is adapted to the specific items being offered by the restaurant. A supermarket may present an interface adapted to supermarket transactions, and specifically to the transactions available at that supermarket. In addition, the point of sale operations carried out at an establishment may change from time to time in a way that makes it desirable to adapt the user interface to current needs. In addition, capabilities and configuration of a point of sale station may change in such a way that it is desirable to adapt the user interface to the changes. In many cases, it may be desired to adapt one or more point of sale stations to self service operation. In many such cases, this adaptation is accomplished through the implementation of screen scraping by a self service application. A screen scraping application collects human readable data, such as display data, and provides this data to another application. In the case of self service applications, a screen scraping application would, for example, retrieve data from touch screen menu items that were selected by a user and would provide this data as inputs to an application interface of a point of sale system. To take an example, if a user made menu selections in a self service restaurant operation for a cheeseburger, regular fries, and medium soft drink, a screen scraping application used to manage a self service interface might extract the text "cheeseburger," "regular," "fries," "medium," and "soft drink" and provide this text to a point of sale application being operated in the self service station. Such operation can give rise to conflicts and out of synchronization conditions between the user interface and the point of sale application.

For example, a point of sale application may fail to recognize that a particular combination of inputs constitutes a special combination entitled to a discount. In addition, conflicts may arise between the applications as to the state of the transaction. In order to insure proper behavior of the application in the transaction, it is often necessary for the self service application to duplicate most of the business logic of the point of sale application, and for the self service application to maintain a duplicate of the point of sale menu information, so that each self service station separately maintains its own copy of menu information which may be stored in a central server, rather than simply depending on the stored information. Such double menu maintenance can lead to significant additional expense to retailers, who may be required to maintain information in a number of data management tools.

SUMMARY OF THE INVENTION

The present invention addresses these problems, as well as others, by providing for creation of a stencil defining a user interface for a point of sale device. The stencil may suitably be implemented in the form of data and instructions which are interpreted by data processing equipment to indicate the appropriate appearance, structure, and behavior of the user interface. Integration of the user interface with the point of sale application defines data exchange between the self service interface and the point of sale application, defining what data is provided to the point of sale application upon selection and activation of the functions implemented at the terminal and what data is presented to the terminal by the point of sale application.

The stencil may be integrated into a point of sale application by mapping user displays, actions, and other characteristics defined by the stencil to appropriate point of sale operations, such as menu selections, payment selection options, transaction navigation options, such as transaction cancellation, transaction entry change or cancellation, and the like, and other choices and selections that may be made by a user or operations that may be carried out by the point of sale device. A database may store one or more different frameworks or models, each describing point of sale operations for a point of sale station, and a specified stencil may be integrated with a framework or model for the point of sale station or environment with which a user interface designed by the stencil is to be used. User interface elements are mapped to the point of sale operations that they invoke, and an integrated point of sale configuration is loaded to the point of sale environment. For example, an integrated point of sale configuration may be stored in memory in a point of sale station, with each user interface element including a binding to an operation to which it corresponds. If desired, the stencil may define only a self service user interface with the point of sale application defining non self service user interface elements, with integration between the stencil and the point of sale application comprising mapping between self service elements defined by the stencil with user interface elements defined by the point of sale application.

A more complete understanding of the present invention, as well as further features and advantages of the invention, will be apparent from the following Detailed Description and the accompanying drawings.

DETAILED DESCRIPTION

Figure 1:
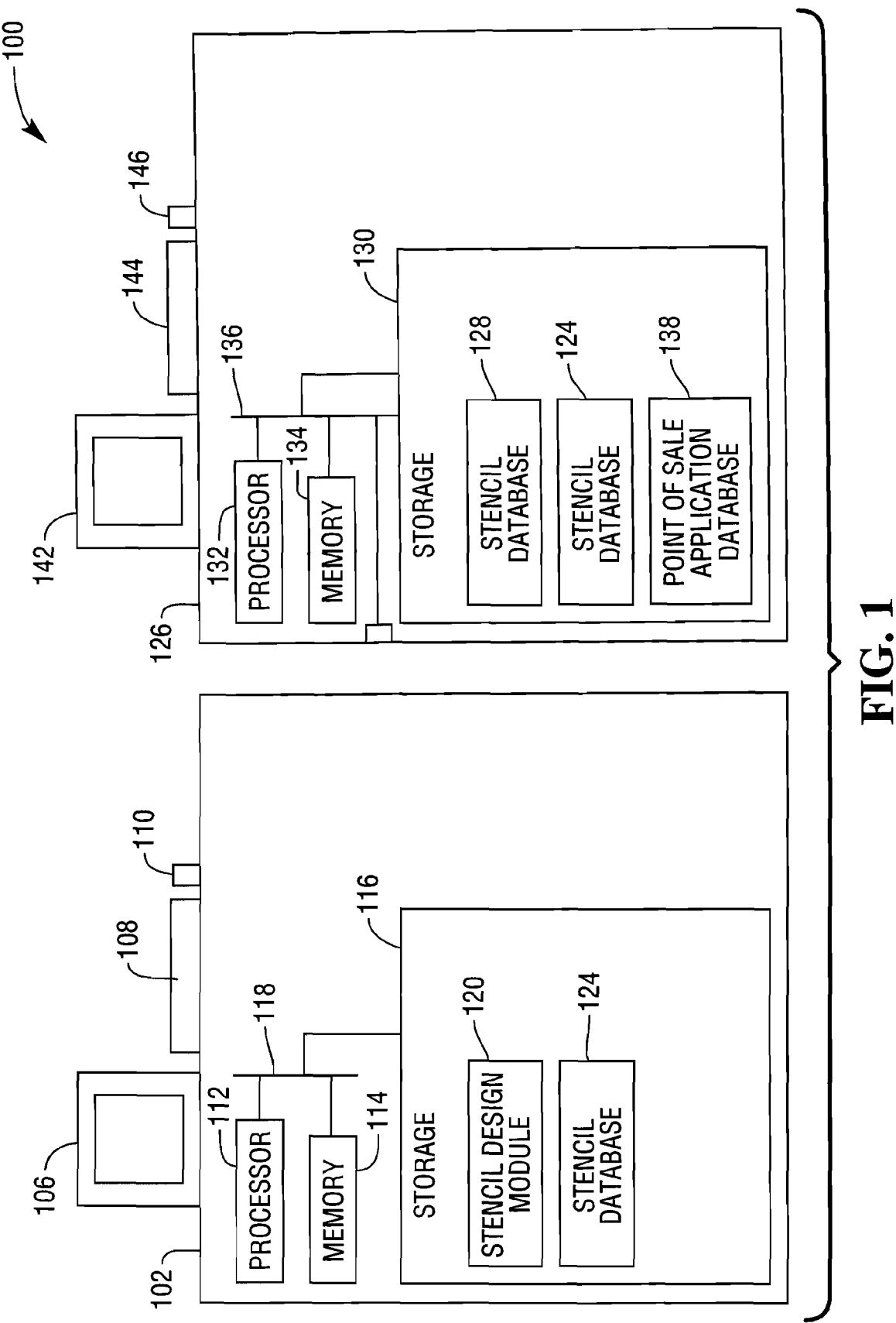
FIG. 1 illustrates a system for creating a user interface and integrating the user interface and a point of sale application for use with a point of sale station according to an aspect of the present invention.

FIG. 1 illustrates a system 100 for creating a user interface for a point of sale station and integrating the interface with the operations of the point of sale station. The system 100 may suitably include a user workstation 102 for designing a user interface, which will typically present one or more displays that will provide selections for activation by a user. For example, a self service user interface may be designed for implementation on a touch screen device and will include menu selection, numerical entry selections for completion of a transaction, navigational elements for moving between displays, and other selections that may be entered by a user in completing a transaction. Design of the user interface may suitably include creating and configuring placeholders that will be connected to and filled by corresponding elements in a point of sale application with which the interface is to be integrated.

For example, a menu arrangement may be defined to allow for the presentation of a set of menu selections, but in order to provide for greater flexibility for configuring the user interface for the specific environment in which it is to be used, the specific menu items that may be selected will be assigned to each menu selection upon integration with a point of sale application for a specific point of sale station. In addition, the organization and relative placement of menu selections and other elements may be defined, but the precise number of such elements will depend on the specific point of sale application with which integration is to be made, and superfluous elements will be discarded during integration.

The workstation 102 includes a designer interface 104, which may comprise a display 106, keyboard 108, and mouse 110, as well as a processor 112, memory 114, and storage 116, communicating over a bus 118. The workstation implements a stencil design module 120, which allows for a designer to make selections and organize elements of the stencil.

For example, a designer may be allowed to select a category for the stencil, such as fast food, coffee shop, supermarket, discount store, or the like. Such category selection presents a standardized design which can then be modified by the designer as desired. Alternatively, a designer may be presented with a more generalized initial design, or may be allowed to design from scratch. Design may include choosing an arrangement of menu elements, specifying categories of menu items, choosing the number of pages, specifying look and feel attributes such as font size and type, foreground and background colors, holiday labels and themes, and other relevant details. The various elements of the stencil include bindings specifying the type of point of sale application element with which they are associated. Menu elements include bindings associating them with similar menu elements supported by the point of sale application, transaction entry elements include bindings associating them with transaction entry elements supported by the point of sale application, payment selection elements include bindings associating them with payment selection elements supported by the point of sale application, and so on. Various sets of elements are associated together in categories, and the categories in which they are assembled point to corresponding categories in which elements of a point of sale application may be grouped. In one embodiment, a stencil may be prepared for a specific, known point of sale application, so that each element of the stencil includes appropriate bindings to corresponding elements of that particular point of sale application. In such a case, each user interface element includes a binding to a corresponding element of the point of sale application, so data and selections are transferred between the user interface defined by the stencil and the point of sale application, with the point of sale application acting on selections and data entries provided through the user interface, and provides data for display by the user interface. For example, a menu button defined by the stencil may include a binding to a corresponding menu selection of the point of sale application, and a display area defined by the stencil may include a binding to specific data, such as transaction entries and totals, generated by the point of sale application as a result of user inputs, so that the information generated by the point of sale application is presented in the designated display area in a format defined by the stencil.

A stencil may be implemented as a data file comprising information defining each element included in the stencil, as well as bindings between each element of the stencil and a corresponding element in a point of sale application. The information included in the stencil may be in a standardized format so that each element that is described by the stencil, and interactions and bindings between the various elements of the stencil, or between elements of the stencil and of a point of sale application or other entity, such as a software module integrating the stencil with a point of sale application, will respond to the definitions, bindings, and other information in an appropriate way, such as by presenting an appropriate graphical element to a developer or user, or by responding to a user's activation of a particular graphical element of the user interface by invoking an associated point of sale application element bound to the user interface element. The stencil preferably defines groupings of elements, with such groupings suitably including hierarchical arrangements. For example, categories of definitions may include menu elements generally, and groupings and subgroupings of menu elements. Each grouping and subgrouping may be identified with appropriate indicia, such as a category identifier or a hierarchy level identifier. For example, entrée items may be identified with the category identifier "entrée," and items within the entrée category may be identified with level indicators, such as level 1 for entrée dishes, level 2 for included sides available with entrée dishes, or level 3 for condiments accompanying entrée dishes. The stencil may also include indicia defining the appearance and arrangement of user interface elements, such as designating the size, color, and appearance of interface buttons, defining grouping of menu buttons, and defining the placement of menu buttons and other interface buttons such as numerical entry buttons, payment selection buttons and other interface elements. The stencil may also include bindings to information such as media information, which may include animations, sound, or other desired information. Bindings to such information may include bindings to files, such as playable media files.

Once the designer has made appropriate selections and assembled the stencil to his or her satisfaction, the stencil may suitably be stored, for example in a stencil database 122 residing in the storage 116. In addition or as an alternative to storage in the local workstation 102, stencils produced by the workstation 102 may be sent to a server 126 for storage in a database 128 residing in storage 130 implemented by the server 126. The server may also suitably include its own processor 132, memory 134, and bus 136. In addition, the server 126 stores a point of sale application database 138, storing point of sale application models that may be integrated with stencils developed using the workstation 102 or other workstations, or originating from any other source.

The server 126 may also include a user interface 140 comprising devices such as a display 142, keyboard 144, and mouse 146. The server 126 also includes an external interface 148 for communication with external devices such as the workstation 102, as well as devices to which integrated point of sale applications are to be provided.

The server 126 implements an integration module 150, which receives as inputs one or more of a stencil and a point of sale application. Depending on the particular manner in which integration is to be performed for a particular point of sale application, a stencil may be submitted and one or more point of sale application models may be retrieved for integration, or a point of sale application may be submitted and an appropriate stencil selected for integration with the point of sale application. As noted above, a stencil designates a plurality of user interface elements and a general layout of the elements and an overall look and feel of the user interface, as well as various capabilities and functions of the user interface.

The integration module 150 receives inputs designating one or both of a stencil and a point of sale application model. In many cases, both the stencil and the point of sale application model will be designated because a user interface is desired for a particular point of sale station or group of stations operating in a similar way. However, the integration module 150 may suitably have the capability to select an appropriate stencil if only a point of sale application model is designated. Stencils and point of sale application models may include indicia serving to categorize them, and such indicia may indicate compatibility between stencils and point of sale application models. If no specific stencil is designated for integration with a particular point of sale application, the integration module 150 may examine indicia of various stencils stored in the database 126 and may select a stencil whose category and other indicia indicate compatibility with the point of sale application under consideration.

In addition or as an alternative to designating one or both of a stencil and a model for selection, selection may be made according to prearranged criteria, such as according to a schedule. Frequently, a stencil is used with a point of sale application and the point of sale application is periodically updated. In order to insure continued correct operation of the user interface defined by the stencil with the point of sale application, integration is performed on a schedule, such as daily.

If only a point of sale application model is designated, the integration module 150 surveys the stencil database 128 and selects a suitable stencil, for example, by selecting a stencil whose category indicia indicate that is in a category compatible with the designated point of sale application model. The point of sale application model and the stencil may be stored in the databases 128 and 138, and inputs to the integration module may be made identifying the stencil and model to be used. In such a case, the integration module 150 retrieves the designated model and stencil from the databases 128 and 138. As a further alternative one or both of the model and stencil may be submitted at the time of integration.

In order to perform integration, the integration module 150 examines the selected stencil and the selected model and assembles an integrated user interface based on information taken from the model and the stencil. A user interface displays information to the user needed to perform point of sale functions desired by a user and to conduct and conclude a transaction in an appropriate and secure way. In order to achieve this end, the user interface displays information to the user as indicated by the underlying point of sale application. The point of sale application may suitably designate a user interface in a more generalized way, relatively independent of the look and feel and placement of the various elements, with the point of sale interface simply indicating the information that is to be presented to the user and the actions to be taken when various selections are invoked and commands are made. Point of sale elements may include menu selections with menu information, function designations, information displays, information entry forms, free form information entry items such as letter and number keys or buttons, and the like. When a user employs the user interface to make a selection or an entry, the user interface invokes a corresponding action in the point of sale application.

The integration module 150 therefore identifies elements of the point of sale application under consideration and binds elements of the stencil to corresponding functions of the point of sale application. If a stencil has been specifically designed for integration with a particular point of sale application, integration will include creating appropriate correspondences between stencil elements and point of sale elements for which bindings have been specified. These elements are organized as specified by the stencil, with grouping, element size, element placement, and similar attributes all being defined by the stencil.

Some elements with specific information taken from the point of sale application may be populated with that information. For example, a restaurant such as a fast food establishment may use a menu with specific items described in a specific way, and the integration module 150 takes the descriptions from the point of sale application model for use with menu selection elements, such as touch screen button images, defined by the stencil. For example, the first button in a menu display defined by a stencil may bind to a point of sale element invoking selection of a bacon cheeseburger. The stencil may include definition of the size and color of the button, and the font and size of the labeling on the button, but may include a binding to the description of the item, so that this description is placed on the menu button at integration. Such an arrangement provides for greater flexibility in case descriptions are changed. In addition, the stencil need not specify any particular elements, but instead may define elements in such a way that all elements defined by a point of sale application will be accommodated. For example, if a stencil defines a menu, it may specify an entrée category and may specify that the entrée category will include subcategories which are classes of entrées. The point of sale application may initially include a hamburger category, a chicken category, and a salad category, and integration of the stencil with the point of sale application will result in the creation of menu buttons for the entrées in each category. Later, a personal size pizza category may be added to the point of sale application, and the addition of this category will result in the creation of additional menu buttons conforming to the specifications of the stencil and populated with information taken from the point of sale application, but without a need to alter the stencil to accommodate the added items.

Other elements of the stencil may invoke functions of the point of sale application, but may be labeled in a more generic way, so that specific labeling from the point of sale application need not necessarily be carried into the element specified by the stencil. For example, a set of payment designation elements may include credit card, debit card, gift card, cash, and check payment options, and generic labeling sufficiently specific to describe the various payment types may be satisfactory. However, in cases in which a point of sale operator desires specific labeling, such as the case in which an operator wishes to use its own proprietary name for the gift card option, the point of sale application model may specify that such specific labeling is to be used and the integration module 150 may apply this labeling to the appropriate element specified by the stencil.

In addition to labeling elements as appropriate, the integration module 150 may also limit the number of elements of the integrated interface to those corresponding to functions and selections of the point of sale application, particularly in cases in which there may be a one to one correspondence, such as in menu selections. In order to achieve greater flexibility, a stencil may define additional menu buttons, for example, beyond those needed for a point of sale interface with which it is to be used, in order to allow for addition of menu selections. A stencil may also have the capability to implement functions in addition to those supported by the point of sale application, and the integration module may leave the interface elements for such functions out of the integrated interface. If the point of sale application is later modified to include the functions, they will be available without a need to modify the stencil.

The integration module 150 examines the stencil and the point of sale application under examination, and creates an integrated point of sale configuration that implements a user interface having characteristics specified by the stencil and that operates in accordance with the point of sale application represented by the point of sale application model. The integrated point of sale configuration manages data transfer between the user interface defined by the stencil and corresponding elements of the point of sale application. For example, activation of menu selection or transaction function buttons will activate corresponding elements of the point of sale application, and data produced by the point of sale application, such as transaction totals or payment information generated in response to transaction entries will be transferred to appropriate elements of the user interface, such as display fields, and displayed in accordance with the parameters defined by the stencil. The integration module 150 creates bindings between the elements of the user interface and the point of sale application functions they invoke, and also synchronizes interface elements with the point of sale applications so that elements and combinations of elements produce expected reactions by the point of sale application.

Figure 2A:
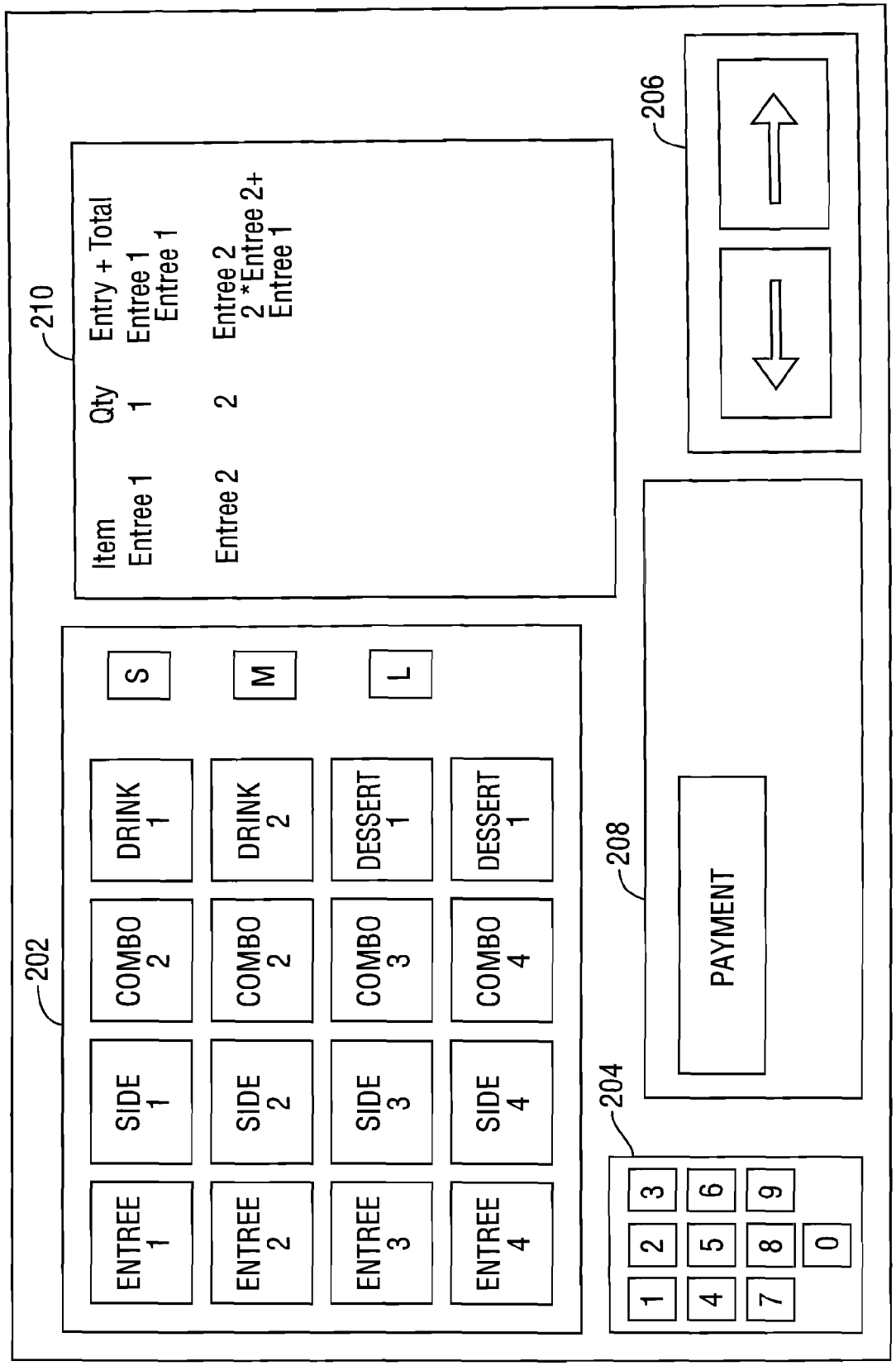
FIGS. 2A and 2C illustrate aspects of a stencil defining user interface elements for integration with a point of sale operation model according to an aspect of the present invention.
Figure 2B:
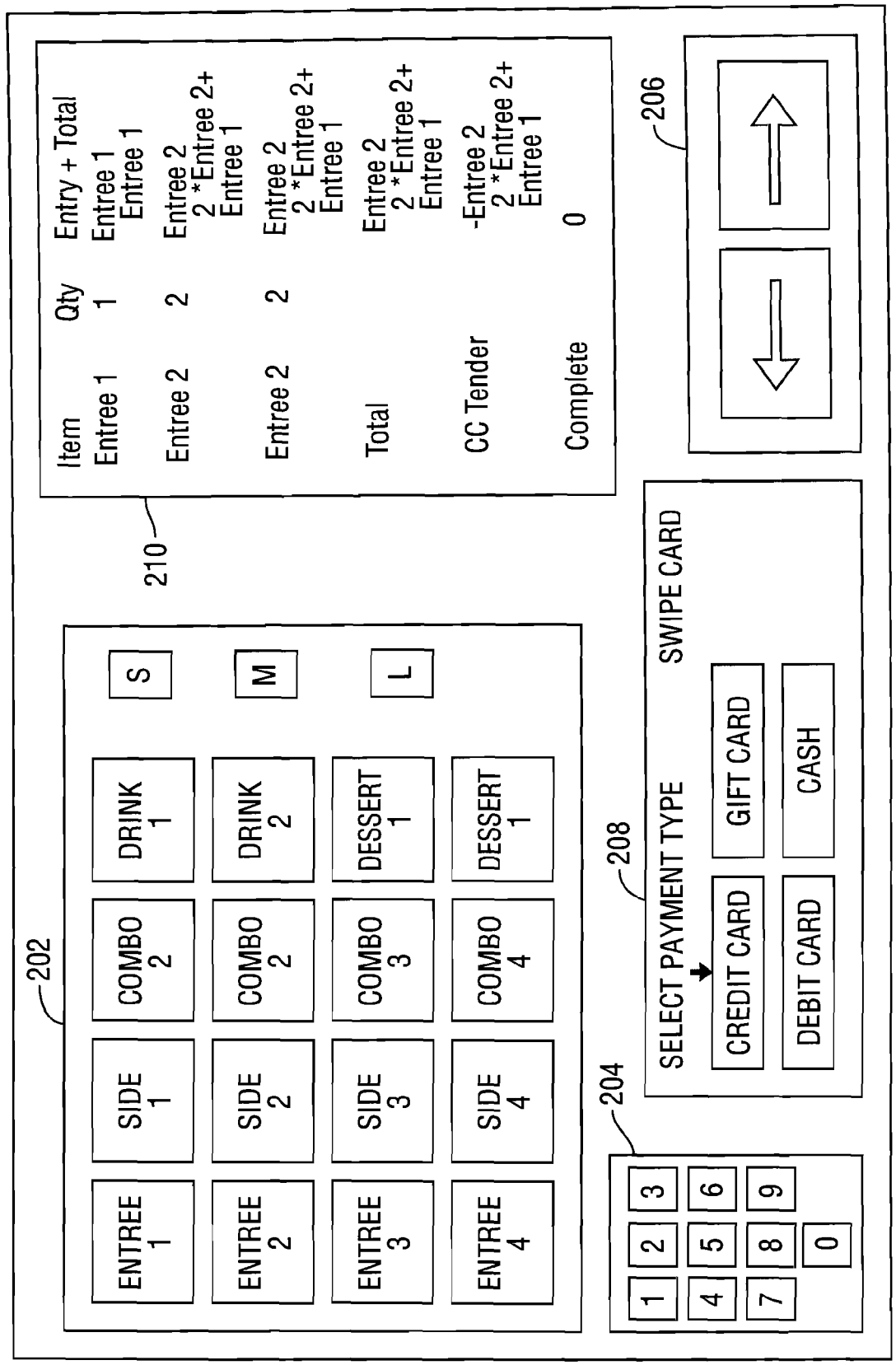
Figure 2C:
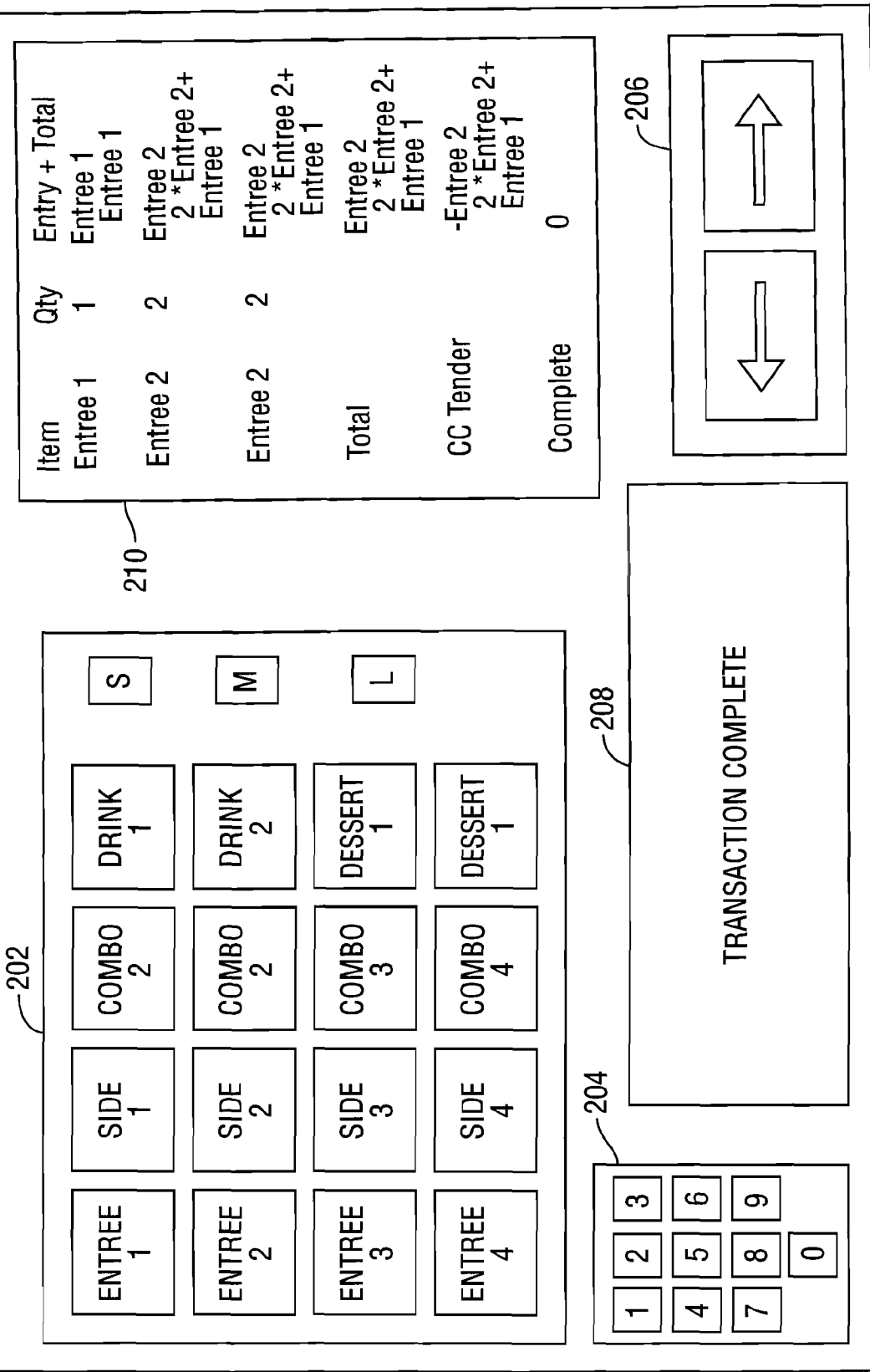

FIGS. 2A-2C illustrate an exemplary structure for a stencil according to an aspect of the present invention. The stencil defines a user interface template 200 for a self service fast food restaurant operation. FIG. 2A illustrates the structure and layout of a user interface, and shows a partially completed transaction conducted using the layout so defined, but before the elements of the layout are joined to a specific point of sale application for specific products.

The user interface template 200 comprises a plurality of selection elements including menu elements and other function selections. An initial screen 202 includes a menu selection section 202, a number section 204, a navigation section 206, and transaction section 208. The menu selection section 202 includes a plurality of menu buttons that are defined as to category, but for which labeling and exact function are deferred until integration with a particular point of sale application takes place. In addition, the number of menu buttons may be increased or reduced at integration to conform to the number of menu selections needed by the point of sale application. The number keys may be used to enter numerical data such as quantities of menu items or entries for financial or payment information. The user interface template 200 also includes navigation keys that may be used to move forward or backward through a set of screens. The payment selection and completion keys invoke payment operations and allow for selection of payment options and tender of payment. Menu selections and payment selections suitably invoke pop-up displays presenting a running list of the transaction items in the case of menu selections, and a succession of payment screens in the case of payment. In the present exemplary embodiment, the information provided to the user by the payment selections are standardized and do not depend on information obtained from the point of sale application for the manner of presentation or content presented. In the present example, a number of menu selections have been made and a transaction record 210 shows the progress made so far, but with the data shown in the transaction record illustrating the interface elements of the template 200, rather than the actual data that will appear in an integrated point of sale application. The transaction record 210 includes entered menu items, menu item designations and quantities for each menu item. Before integration, the record does not specify the actual items being selected, but instead is tied to the selection key used to make the selection. At integration, the information for each menu key is bound to that key, so that the record will include the menu item being entered.

FIG. 2B illustrates the user interface template 200 displaying an intermediate stage of a transaction after a number of menu selections have been made and payment has been initiated. The transaction section 208 has changed its appearance from that presented in FIG. 2A. Payment has been selected and now selections are available showing selections for payment type. As selections are made and various functions presented by the transaction section are invoked, they may give way to further displays to present the selected functions and to allow actions with respect to those functions. For example, an initial selection to conclude a transaction and make payment is here shown to result in presentation of a display offering selection of payment type, such as credit card, debit card, check payment, or cash payment. The credit card option has been selected and is highlighted, and an instruction has been presented to swipe the credit card. If a debit card had been selected, an instruction to enter a personal identification number might have been presented after swiping of the card. The template 200 defines various paths that may be taken to complete a transaction, with the various selections and instructions being presented to follow each path.

FIG. 2C illustrates the conclusion of the transaction. The transaction record 210 shows the menu entries that have been selected, the transaction total expressed in terms of those menu entries, a credit card tender equal to the transaction total, and a balance of zero representing subtraction of the credit card tender from the transaction total. The transaction section 208 indicates completion of the transaction.

Figure 3:
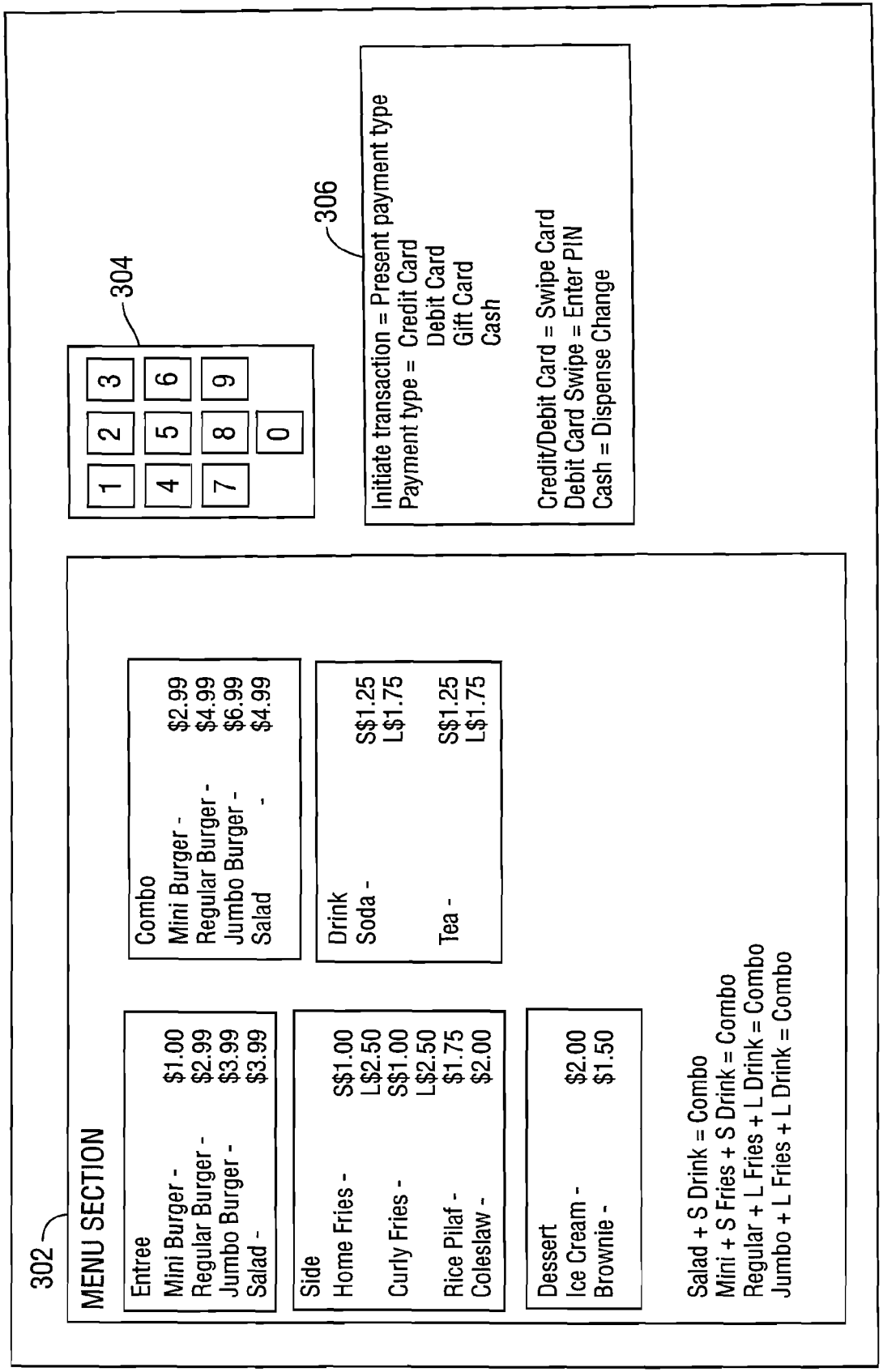
FIG. 3 illustrates a point of sale application model representing features of a point of sale application according to an aspect of the present invention.

FIG. 3 illustrates a point of sale application model 300 according to an aspect of the present invention. The point of sale application model comprises information defining the functions carried out by the point of sale application it represents and providing information allowing for binding between the point of sale application and a stencil defining a user interface for the point of sale application. The point of sale application model 300 may suitably be in the form of a data assembly without reference to graphical properties or organization of the data because such graphical properties and organization are defined by a user interface template such as the template 200. The model 300 comprises a menu section 302, a number section 304, and a transaction function section 306. Elements grouped in the various sections describe the various operations performed by the point of sale application and the information that is to be provided to a user in carrying out those functions, and these elements include descriptive features that indicate how they are to be bound to elements of the user interface template 200. Elements of the menu section 302 include category information, such as identifying the element as a main course item, side item, drink item, combination, and indications of bindings to other items. For example, selection of certain combinations of main and side items calls for pricing as a combination meal, and the menu section shown here illustrates the different combinations of selections for which this rule prevails. These bindings are used to inform organization of user interface elements and the information presented by user interface elements.

Figure 4:
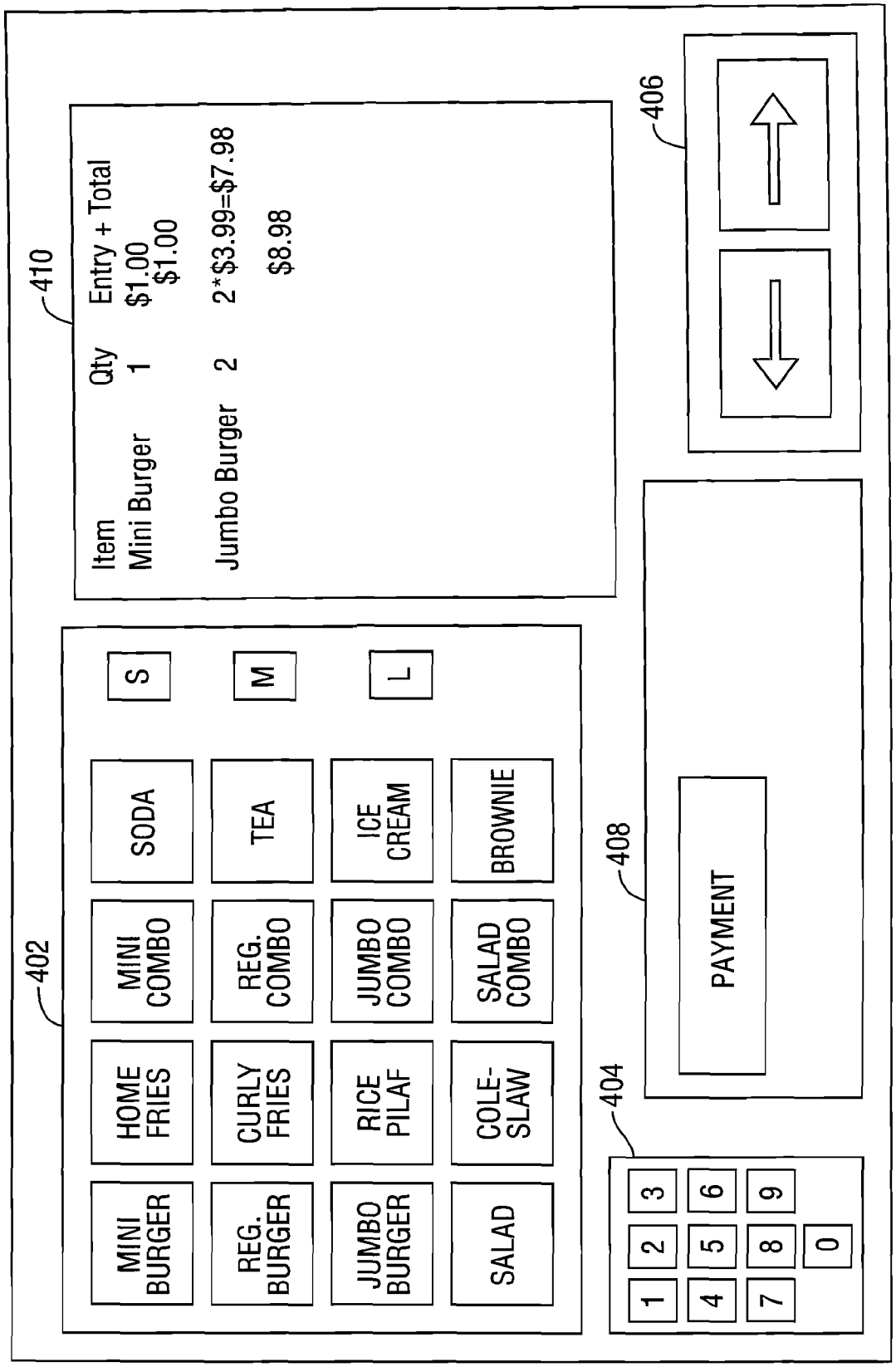
FIG. 4 illustrates an integrated point of sale configuration resulting from integration of a user interface stencil and a point of sale operation model according to an aspect of the present invention.

FIG. 4 illustrates a user interface 400 implemented by an integrated point of sale configuration created by integration of the stencil 200 with the point of sale application model 300. The elements of the user interface 400 include elements organized and designed according to the specifications of the stencil 200, and presenting the information and invoking the functions specified by the point of sale application model 300. When the user interface 400 is loaded to a point of sale station, it will control the user interface of the point of sale station so that the selections invoke appropriate functions of the point of sale application and will respond to commands and communications from the point of sale application so as to respond correctly and provide correct information to the user. The user interface 400 comprises a collection 402 of menu selections, created by merging menu elements of the interface template 200 with the application model 300. The user interface 400 also comprises a number section 404 for numerical entries, a navigation section 406, a transaction entry section 408 for managing payment, and a transaction record 410, which are all visible here. The user interface 400 or a similar user interface also includes additional elements, such as displays and selection elements invoked upon particular user selections, such as menu selections or transaction selections.

Figure 5:
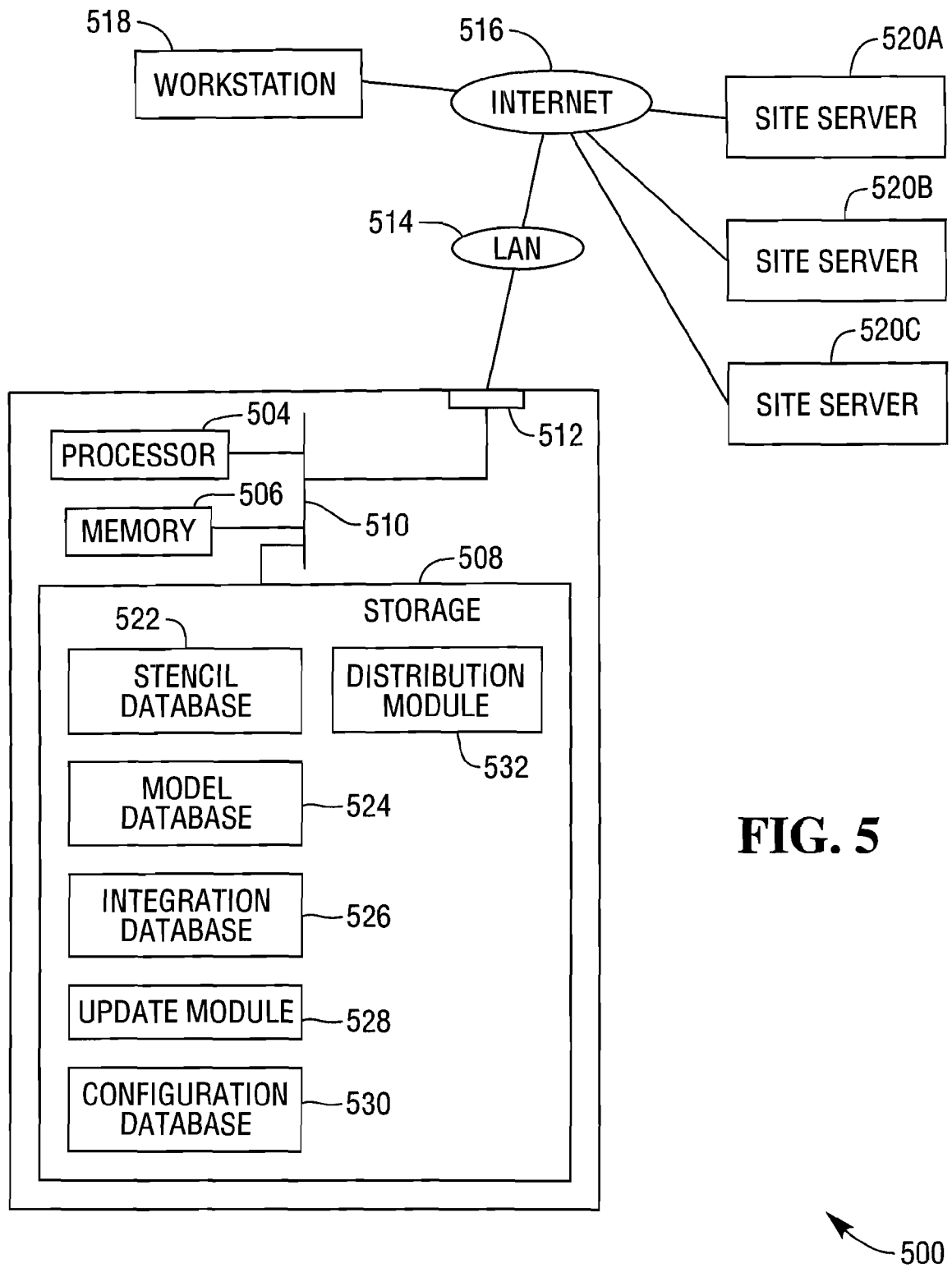
FIG. 5 illustrates a system for maintaining and distributing user interface information for point of sale stations.

FIG. 5 illustrates a system 500 for maintaining user interface information and transferring appropriate user interface information to a point of sale station as needed. Such transfer may come in the form of a periodic update, such as a daily update. The system 500 comprises a central server 502, suitably including a processor 504, memory 506, and storage 508, communicating over a bus 510. The central server 502 also suitably includes an external interface 512, which provides for communication with external devices. This communication may suitably be carried out over a local area network 514, which may in turn provide a connection to the public Internet 516. The central server 502 may communicate with one or more workstations such as the workstation 518, which may be similar to the workstation 100 of FIG. 1. The central server 502 may also communicate with a plurality of site servers such as the servers 520A-520C, operated by or on behalf of retailers and serving point of sate stations at retailer locations. The site servers may act as conduits for communication with a retailers point of sale stations and the central server 502, but it will be recognized that individual point of sale stations may also communicate with the central server 502.

The central server 502 stores a collection of stencils in a stencil database 522, suitably residing in storage 508. The central server 502 periodically receives new or updated stencils, or updates to existing stencils, and updates the database 522 to replace or change stencils as appropriate. The central server 502 also stores a collection of point of sale application models in a model database 524, and an integration module 526. The central server 502 may have capabilities similar to those of the server 126 of FIGS. 1 and 2, but is illustrated separately here to highlight its additional role of updating point of sale interfaces and configurations for point of sale stations.

The server 502 also stores an update module 528, which manages the handling of incoming updates to stencils and point of sale application models. The update module 528 directs communications with various external devices to request and receive updates. The update module may direct periodic inquiries whereby the server 602 interrogates the various devices to which the server 502 is connected in order to receive newly updated stencils and models, and may also transfer updated models to external devices used in the creation of stencils, such as the workstation 102, so that updated stencils may be furnished if appropriate. When a new stencil or model is received, it is stored in the stencil or model database 522 or 524, as appropriate.

The server 502 may also store an integrated point of sale configuration database 530, which in turn stores integrated point of sale applications produced by the integration module 526 acting on stencils and models from the databases 522 and 524. At appropriate intervals, such as daily, or upon receipt of a new or updated item, the integration module 526 produces and stores new integrated user interfaces.

The server 502 may also implement a distribution module 532. The distribution module 532 transfers updated point of sale applications to point of sale operations. The distribution module 532 may respond to interrogations from external point of sale servers such as one of the servers 520A-520C, or may perform distribution periodically according to an interval or a schedule. In one exemplary embodiment, the server 502 transfers sets of integrated point of sale interface instructions to site servers maintained at or otherwise serving retail sites employing a plurality of point of sale stations, and each site server transfers an integrated point of sale application to the point of sale stations it serves. In the example presented here, the site server 520C serves point of sale stations 538A, 538B, and 538C. Under the control of the distribution module 532, the server 502 selects appropriate integrated point of sale applications from the database 526 and passes them to the server 520C. The server 520C then transfers each point of sale application to the point of sale station it servers. Each of the point of sale stations 538A, 538B, and 538C loads and uses the point of sale application it receives. Each integrated point of sale application is developed so as to support the hardware and services of the point of sale station on which it operates and to manage user input output devices such as keyboards and displays to present a user interface as specified by the stencil used to develop the integrated point of sale application.

As an alternative to integrating a stencil and a point of sale application model at a central server the integration may occur at a site server such as the server 520C. The stencil may be transferred to the server 520C, which performs integration and which then transfers the integrated application to the appropriate point of sale stations. Whether integration occurs at the central server 502 or the site server 520C, transfer to one of the point of sale stations 538A-538C may consist of extraction of user interface screens, such as a set of user interface screens for the point of sale application and a set of self service screens for a point of sale application, and the transfer of these screens to a point of sale station in the form of an update.

In addition to storing an integrated point of sale application to a point of sale station, a server such as one of the site servers 520A-520C or the central server 502 may create a user interface definition based on a stencil, with user interface elements adapted to the point of sale application and with bindings to corresponding elements of a point of sale application, and may store this user interface definition to a self service device. The self service device uses the definition to invoke appropriate elements of the point of sale application based on user interface inputs, and to activate appropriate user interface elements based on the data received from the point of sale application. As an alternative to creating a set of instructions using a point of sale application model, a stencil may be transferred to a self service device and when the self service device and the point of sale device begin communication, the point of sale device may transfer user interface and device information to the self service device and vice versa, allowing the point of sale device to map point of sale screen and transaction elements to create a user interface definition based on the information received from the point of sale device.

Figure 6:
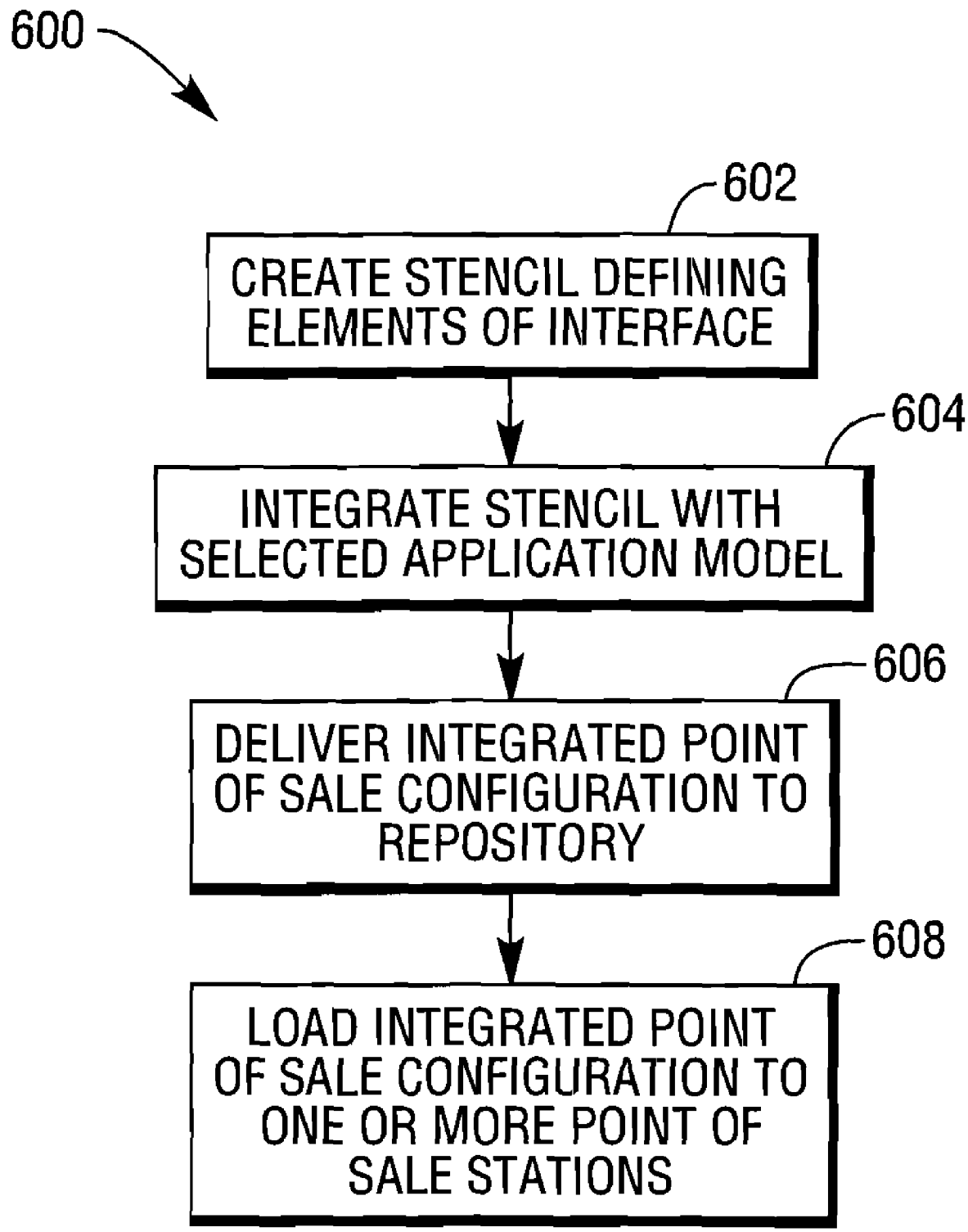
FIG. 6 illustrates a process of user interface definition and integration according to an aspect of the present invention.

FIG. 6 illustrates a process 600 of point of sale application management according to an aspect of the present invention. At step 602, a stencil is created defining elements of a desired user interface for a point of sale station. The stencil defines elements of the user interface and their organization, and includes indicia indicating the correspondence between elements of the user interface and elements of point of sale application with which the user interface may be employed. At step 604, the stencil is integrated with a selected point of sale application model, with integration including mapping user interface elements with point of sale elements and functions invoked by the user interface, and adding information to user interface elements corresponding to the point of sale application information to be displayed and functions to be undertaken using the point of sale application. Integration may include, for example, adding specific information associated with the point of sale application to generic information associated with the user interface definition, such as adding names of specific menu items defined by the point of sale application to generic menu selection keys defined by the user interface. At step 606, an integrated point of sale configuration is delivered to a repository serving point of sale stations with which the integrated point of sale application is to be used, such as a site server providing services to a retail location. At step 608, the integrated point of sale configuration is loaded to one or more point of sale stations, with loading comprising installing programming and definitions to appropriate devices making up the point of sale station. Such installation may comprise, for example, extracting a set of self service interface screens to be used with a user interface device used by the point of sale station, extracting self service media elements, such as sound or animations to be presented by the self service interface, extracting a further set of point of sale interface screens to be used as an operator interface, and extracting configuration information defining the point of sale station business operations and bindings between the interface elements and point of sale business functions and information to be invoked and presented in response to selection of user interface elements.

While the present invention is disclosed in the context of a presently preferred embodiment, it will be recognized that a wide variety of implementations may be employed by persons of ordinary skill in the art consistent with the above discussion and the claims which follow below.

I claim:

1. A server for creating a point of sale configuration for use in a point of sale station, comprising:
a stencil repository for storing one or more user interface stencils, each stencil defining a user interface that may be employed in a point of sale operation;
a point of sale application model repository for storing one or more point of sale application models, each point of sale application model defining functions carried out by the point of sale application described by the model; and
a processor operative to retrieve a user interface stencil and a point of sale application model and integrate the user interface stencil and the point of sale application described by the model to produce a point of sale configuration, the point of sale configuration providing instructions for presenting elements of the user interface and defining bindings between elements of the user interface and corresponding functions and elements of the point of sale application to manage transfer of data and commands between the user interface and the point of sale application.

2. The server of claim 1, wherein a stencil defines a self service user interface and wherein the stencil includes binding information defining bindings between elements of the stencil and corresponding user interface elements of a corresponding point of sale application.

3. The server of claim 2, wherein the stencil defines size, shape, and placement of menu elements.

4. The server of claim 1, wherein the stencil and the point of sale application include information classifying them into categories and wherein the processor is operative to select a stencil for a point of sale application in the same category as the stencil.

5. The server of claim 3, wherein one or more point of sale applications includes menu data for menu items and wherein integration of a stencil with a point of sale application comprises filling menu selection elements defined by the stencil with menu data associated with user interface elements with which the menu selection elements are bound.

6. The server of claim 1, wherein one or more of the stencils includes indicia indicating the overall look and feel of the user interface defined by the stencil and wherein the processor is further operative to respond to changes in a point of sale application by adding new user interface elements for the point of sale configuration according to the indicia defined by the look and feel of the interface defined by the stencil.

7. The server of claim 1, wherein the indicia indicating the overall look and feel of the stencil includes specifications of media elements to be presented in the user interface defined by the stencil.

8. The server of claim 1, wherein one or more point of sale application models comprises definitions of point of sale application behavior based on selection of combinations of elements, and wherein integration of a stencil with a model comprises identification of combinations of inputs to the model that invoke specified functions, identification of user interface elements producing inputs belonging to the combinations, and binding of combinations of user interface elements to the specified functions.

9. The server of claim 1, further comprising a repository of point of sale configurations and wherein the processor is further operative to distribute point of sale configurations for loading to point of sale stations.

10. The server of claim 1, wherein one or more stencils defines categories of user interface elements and wherein the processor is operative to integrate the one or more stencils with corresponding point of sale applications by creating user interface elements conforming to the categories and corresponding to associated functions of the point of sale applications.

11. A method at a server for creating a point of sale configuration for use in a point of sale station, comprising:
maintaining a stencil repository of one or more stencils, each stencil defining a user interface that may be employed in a point of sale operation;
maintaining a point of sale application model repository of one or more point of sale application models, each model defining functions carried out by a point of sale application described by the model;
retrieving a stencil and a corresponding point of sale application model,
performing integration of the stencil with the point of sale application described by the model to create an integrated point of sale configuration, the integrated point of sale configuration providing instructions for presenting elements of the user interface and defining bindings between elements of the user interface defined by the stencil and corresponding elements of the point of sale application to manage transfer of data and commands between the user interface and the point of sale application.

12. The method of claim 11, wherein the stencil is a self service application and integration of the stencil with the point of sale application comprises binding self service user interface elements defined by the stencil with corresponding user interface elements defined by the point of sale application.

13. The method of claim 11, wherein performing integration of the stencil with the point of sale application comprises identifying corresponding categories of user interface elements and categories of point of sale application functions and creating bindings between individual user interface elements and point of sale application functions falling into the same category.

14. The method of claim 11, wherein performing integration of the stencil with the point of sale application comprises identifying categories of user interface elements corresponding to categories of point of sale elements and adding specific data from individual point of sale application elements to individual user interface elements in the corresponding category.

15. The method of claim 11, further comprising loading the integrated point of sale configuration to a point of sale station.

16. The method of claim 15, wherein the stencil defines self service user interface screens for a self service device employed by a point of sale station and point of sale transaction elements for the point of sale application, wherein loading the integrated point of sale configuration comprises extracting and loading self service user interface screens to the self service device and loading mapping information defining bindings between the self service user interface screens and point of sale transaction elements.

17. The method of claim 11, wherein the stencil defines categories of user interface elements corresponding to categories of functions of the point of sale application, and wherein integrating a stencil with a point of sale application comprises creating a user interface element, for each user interface element designated by the point of sale application, with each user interface element so created having features corresponding to those of the category defined by the stencil.

\* \* \* \* \*